Nov. 23, 1965   E. BROWN   3,219,460
FROZEN FOOD PACKAGE AND METHOD FOR PRODUCING SAME
Filed Nov. 20, 1962

INVENTOR.
EUGENE BROWN
BY
his   ATTORNEYS 3,219,460
	FROZEN FOOD PACKAGE AND METHOD
		FOR PRODUCING SAME
Eugene Brown, Great Neck, N.Y., assignor to Lever
   Brothers Company, New York, N.Y., a corporation of
   Maine
		Filed Nov. 20, 1962, Ser. No. 238,966
			9 Claims. (Cl. 99—192)

This invention relates to a food container. More particularly, it is concerned with a container having one or more frozen foods therein.

It is known (U.S. Pat. No. 2,714,070) to provide a dielectric container having several compartments for different food items and to place the container in an electronic cooker. A metallic shield may be positioned on the entire top surface of all the compartments to preclude local burning on the top surfaces of the food items and to permit the cooking of the side and bottom surfaces of the food items. Alternatively, the container may have a shield over one entire food, such as ice cream, to prevent the heating of the food when the container is placed in an electronic cooker, and it may not have a shield over another food, such as chocolate sauce, to permit the heating of the food.

It is also known (U.S. Pat. No. 2,600,566) to use a metallic shield to prevent substantially one part of a multiple-food package from being heated in an electronic cooker while the unshielded other part is being substantially heated. For example, a syrup portion may be heated without substantially heating an ice cream portion; a meat layer in a sandwich may be heated without substantially heating the bread layers; and a chow mein stew portion may be heated without substantially heating a noodle portion.

However, these procedures are not suitable for cooking simultaneously in an electric oven two food items that require different cooking times for a given temperature. If a shield is placed on one food and not on the other food, the shielded food is substantially uncooked while the unshielded food is adequately cooked. If the two food items are placed in the cooker with the same shield covering their top surfaces or without any shield at all, the long time required to cook sufficiently one food forms an overcooked second food.

It has now been discovered that two or more frozen food items which independently have different cooking times may be cooked in an electronic cooker at the same temperature for the same period of time. Thus, in accordance with one embodiment of this invention each food is placed in an individual compartment in a single package. Each compartment is shielded with a certain amount of electrically conductive material, such as aluminum foil. The amount of aluminum foil over each food and its compartment is varied by using different sized openings therethrough, such as crisscross designs, strips, punched sheets and geometric designs. Accordingly, the area of aluminum foil employed for each food varies inversely with the required cooking time since, for example, the high frequency waves used in a "Radar" range do not penetrate the aluminum shield where provided.

In a second embodiment of this invention, each food item heretofore requiring a different time for cooking is independently packaged with a predetermined amount of aluminum foil or the like. The amount of aluminum foil is varied as in the first embodiment. Two or more of these independent packages are placed into an electronic cooker. Each food item is cooked at the end of the same time period at the same temperature.

This invention may be more fully understood from the following description in conjunction with the accompanying drawing in which.

Figure 1:
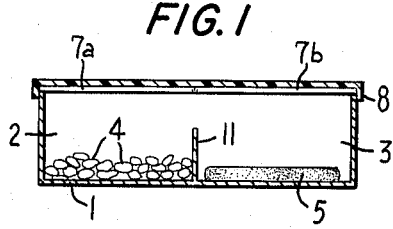
FIGURE 1 illustrates the side view of a container having a compartment for each of two different frozen food items.
Figure 2:
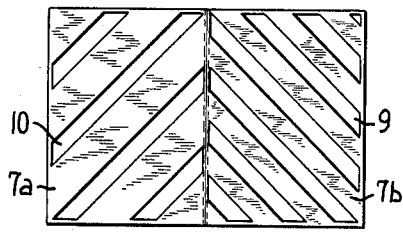
FIGURE 2 is the top view of the container shown in FIGURE 1.

Referring now to FIGURES 1 and 2 which represent a first embodiment of this invention, container 1 has first compartment 2 with first frozen food 4 that requires a short cooking time. Second frozen food 5 requiring a long cooking time is disposed in second compartment 3. The five sides of container 1 exclusive of the top surface is formed from aluminum or other electrically conductive material. These five sides are shields which prevent penetration of high frequency waves from an electric cooker. Alternatively, these five sides of the container may be made from a dielectric material but they must then have aluminum or the like completely covering the dielectric material to provide the required shielding effect. Strips 7a of aluminum foil or the like cover the top surface of container 1 in such a manner to shield partially food 4 in compartment 2 and to provide a relatively small unshielded area 10. Aluminum foil strips 7b cover the top surface of container 1 to shield partially food 5 in compartment 3 and to provide a relatively large unshielded area 9. Strips 7a and 7b may be independently applied, crimped together and then crimped to the sides of container 1; or they may comprise a preformed mold to cover the entire top surface of container 1. Dielectric cover 8 is placed contiguous to strips 7a and 7b to cover the entire top surface of container 1, and it is joined to the sides of or is wrapped around the bottom of container 1. If container 1 is made from a dielectric material as described above, cover 8 may be part of a unitary container, and strips 7a and 7b may be disposed on top of cover 8 cooperating with the metallic shield surrounding the other five sides of the container. Divider 11 is disposed in container 1 to provide first compartment 2 and second compartment 3. This divider may advantageously cooperate in providing the differential heating effect in the compartments by being formed from aluminum or the like and by extending from the bottom surface of container 1 to engage with the metal strips.

Figure 3:
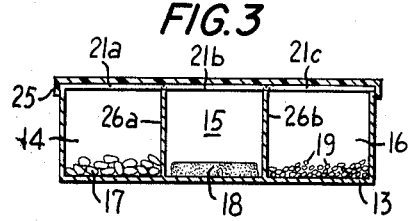
FIGURE 3 shows the side view of a container having a compartment for each of three different frozen food items.
Figure 4:
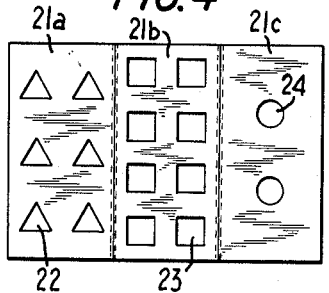
FIGURE 4 is the top view of the container shown in FIGURE 3.
Figure 6:
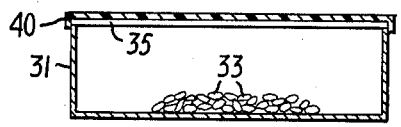
FIGURE 6 is the side view of the first container shown in FIGURE 5.
Figure 7:
FIGURE 7 is the top view of the first container shown in FIGURE 5.
Figure 8:
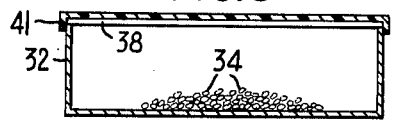
FIGURE 8 is the side view of the second food container shown in FIGURE 5.
Figure 9:
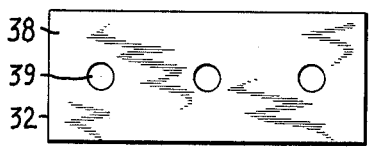
FIGURE 9 is the top view of the second food container shown in FIGURE 5.
Figure 5:
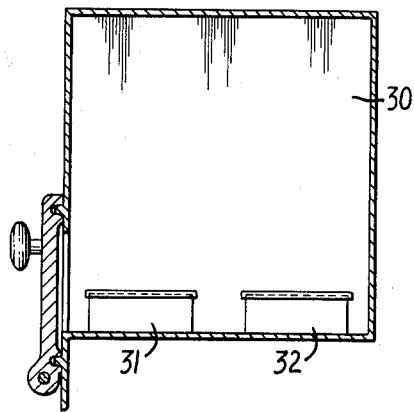
FIGURE 5 illustrates an electronic cooker for a first container and a second container, each container having a different frozen food item therein.

Turning now to FIGURES 3 and 4, aluminum container 13 has first compartment 14, second compartment 15 and third compartment 16 with three different frozen foods 17, 18 and 19, respectively, therein. Food 18 requires the longest cooking time, food 17 the next longest cooking time and food 19 the shortest cooking time. Aluminum foil shield 21a covers partially first compartment 14 containing first food 17 and forms unshielded area 22. Aluminum foil partial shield 21b is positioned over second compartment 15 for food 18 to provide unshielded area 23 which is larger than unshielded area 22. Shield 21c also made from aluminum foil or the like covers third compartment 16 containing food 19. Unshielded area 24 formed thereby is smaller than unshielded area 22. Dielectric cover 25 is disposed contiguous to shields 21a, 21b and 21c to cover the top surface of container 13. Dividers 26a and 26b form compartments 14, 15 and 16. The alternative considerations for the container, cover, dividers and shields are similar to those heretofore described for FIGURES 1 and 2.

The second embodiment of this invention is represented by FIGURES 5, 6, 7, 8 and 9. Electronic cooker 30 has a first food container 31 and a second food container 32 therein. Food 33 in container 31 requires a relatively long cooking time whereas food 34 in container 32 requires a relatively short cooking time. These food containers have their sides and bottom surfaces made from aluminum foil or some other electrically conductive material, or they are made from a dielectric material with aluminum foil completely shielding them as a wrap. Shield 35 also made from aluminum foil or the like is disposed at the top surface of container 31 to provide unshielded area 36 which permits relatively large amounts of heat to penetrate into the container. Similarly, aluminum foil shield 38 partially covers the top surface of container 32. Unshielded areas 39 are disposed in the shield 38 to permit a relatively small amount of heat to reach food 34 therein. Both shields 35 and 38 have dielectric covers 40 and 41, respectively, which may be similar to the covers heretofore described for the first embodiment.

Any known electronic cooker, i.e., high frequency heating chamber, may be employed in this invention. The conventional "Radar" range, which is dependent upon the use of high frequency alternating current generated by vacuum tubes, is preferred. However, some other high frequency heating apparatus may also be applicable, such as electronic heating, radio wave heating, diathermic heating or dielectric heating where heat is created by electronic generators of the vacuum tube type.

The container used in either embodiment of this invention may be a dielectric material, such as paper, plastic, or it may be a dielectric Pyrex casserole dish. If a dielectric container is employed, an electrically conductive material, such as aluminum, must be wrapped completely around its sides and bottom surface. The sides and bottom surface of the preferred container are formed from aluminum itself which obviates the need for a dielectric layer. The top surface of the container is adapted to receive a shield of aluminum foil or the like having openings, e.g., holes, crisscross designs and geometric designs, therethrough. Positioned completely over the aluminum foil which partially shields the top surface of the container is a dielectric material, such as plastic. One purpose of this cover, of course, is to prevent air, moisture or foreign objects from entering the food container and to prevent the food from falling out of the container. The container may also have dielectric material on all six sides. Complete shields then cover the bottom surface and sides of the container and a partial shield covers the top surface of the container; however, it would not be necessary to have another dielectric material disposed on top of the partial shield.

In the present invention, the heat from an electronic cooker quickly penetrates a non-conducting substance, such as a plastic cover. However, the heat does not readily penetrate but merely is crowded onto the surface of the aluminum foil or other conducting material employed for the shield members. The amount of shielding on the top of the container for a single food package or on top of each compartment in the container for a multi-food package is predetermined. The amount of shielding is varied by including more or less openings in the aluminum foil. For example, a shield has very few openings to permit very limited access to high frequency waves for a frozen food that does not require a long cooking time. In contrast, a shield has numerous openings if a frozen food requires a long cooking time; this permits substantial access to high frequency waves since the heat is transmitted quickly through the dielectric cover not shielded by the aluminum foil.

In a first embodiment of the instant invention, the food container has two or more compartments, and each compartment contains a frozen food therein. These frozen food items normally would require different cooking times at a given temperature. A shield of aluminum foil is disposed on the top of each compartment; however, each shield has a predetermined amount of openings therein. In effect, there is a plurality of partial shields covering the top surface of the container. The unshielded area (openings) or the shielded area is selected according to the time needed to cook each food. If a long cooking time is required, the unshielded area (openings) is relatively large or, in other words, the shielded area is relatively small. Conversely, if a short cooking time is required, the unshielded area is relatively small, i.e., the shielded area is relatively large. Accordingly, the amount of openings (unshielded area) in the aluminum foil shield over each compartment varies directly with the time necessary to cook the food in each compartment. When the area of the openings is large, there is very little shielding action by the aluminum foil, and the food is exposed to considerable microwave energy with rapid heating occurring therein. When the area of the openings is small, there is a significant shielding action, and relatively little heat energy will be absorbed by the food body thereunder.

Although a second embodiment of this invention is concerned with the combination of two or more independent food containers, partial metallic shields are utilized in a somewhat similar manner as described for the first embodiment. If the container has a food that normally demands a long cooking time at a certain temperature, the area of the unshielded portion, i.e., the openings in the aluminum foil, on the top of the container is relatively large. On the other hand, if the container has a food that normally demands a short cooking time, the area of unshielded portion is relatively small. The containers with the different food items therein may be placed in an electronic cooker at the same temperature for the same time period. When removed, the food in each package is cooked to the same degree.

Thus, in accordance with this invention, it is now possible to cook simultaneously two food items both of which require some cooking, but heretofore one food item requiring more cooking time than the other at a certain temperature. The different food items may be provided in the single container which has individual compartments to contain each food. The multi-food container may be heated at a fixed temperature in an electronic cooker, such as a "Radar" range, with each food therein being adequately cooked at approximately the same time. Alternatively, each food may be packaged in separate containers and these separate containers may be placed into a "Radar" range or the like to cook the food items simultaneously, i.e., at the same time and temperature.

Having set forth the general nature and specific embodiments of the present invention, the true scope is now particularly pointed out in the appended claims.

What is claimed is:

1. An article which comprises a container having its bottom surface and four sides made from an electrically conductive material to act as shields when placed in an electronic cooker; a divider disposed intermediate the ends of the bottom surface to form a first compartment and a second compartment in said container; a first frozen food in said first compartment which independently requires a relatively short cooking time; a second frozen food in said second compartment which independently requires a relatively long cooking time; an electrically conductive first partial shield covering the top surface of said first compartment in said container to form a relatively small predetermined unshielded area; an electrically conductive second partial shield covering the top surface of said second compartment to form a relatively large predetermined unshielded area; a dielectric member covering the unshielded areas in said first and second partial shields; said article capable of being placed in an electronic cooker at a certain temperature to provide a cooked first food and a cooked second food after a certain time period.

2. An article which comprises a container having its bottom surface and four sides made from an electrically conductive material to act as shields when placed in an electronic cooker; two dividers disposed intermediate the ends of the bottom surface to form a first compartment, a second compartment and a third compartment in said container; a first frozen food in said first compartment which independently requires a relatively short cooking time; a second frozen food in said second compartment which independently requires more cooking time than said first frozen food; a third frozen food in said third compartment which independently requires more cooking time than said second frozen food; an electrically conductive first partial shield covering the top surface of said first compartment in said container to form a relatively small predetermined first unshielded area; an electrically conductive second partial shield covering the top surface of said second compartment to form a predetermined second unshielded area which is larger than said first unshielded area; an electrically conductive third partial shield covering the top surface of said third compartment to form a predetermined third unshielded area which is larger than said second unshielded area; a dielectric member covering the unshielded areas in said first, second and third partial shields; said article being capable of being placed in an electronic cooker at a certain temperature to provide a cooked first food, a cooked second food and a cooked third food after a certain time period.

3. A process for packaging frozen food which comprises placing a frozen food in a container having its bottom surface and four sides made from an electrically conductive material to act as shields when placed in an electronic cooker; covering the top surface of said container with an electrically conductive partial shield to form a certain predetermined unshielded open area for the high frequency waves when placed in the electronic cooker; and covering the unshielded area in said partial shield with a dielectric member to provide a package which when placed in an electronic cooker at a certain temperature and time period provides an evenly cooked food.

4. A process for packaging and heating frozen food which comprises placing a first frozen food which independently requires a relatively short cooking time in a first compartment of a container, said container having its bottom surface and four sides made from an electrically conductive material to act as shields when placed in an electronic cooker; placing a second frozen food which independently requires a relatively long cooking time in a second compartment of the container; covering the top surface of said first compartment in said container with an electrically conductive first partial shield to form a relatively small predetermined unshielded open area for the high frequency waves when placed in the electronic cooker; covering the top surface of said second compartment with an electrically conductive second partial shield to form a relatively large predetermined unshielded open area for the high frequency waves when placed in the electronic cooker; covering the unshielded areas in said first and second partial shields with a dielectric member to provide a package therefrom; and placing said package in an electronic cooker at a certain temperature and for a period of time to provide a cooked first food and a cooked second food.

5. A process for packaging and heating frozen food which comprises placing a first frozen food which independently requires a relatively short cooking time in a first compartment of a container, said container having its bottom surface and four sides made from an electrically conductive material to act as shields when placed in an electronic cooker; placing a second frozen food which independently requires more cooking time than said first frozen food in a second compartment of the container; placing a third frozen food which independently requires more cooking time than said second frozen food in a third compartment of the container; covering the top surface of said first compartment in said container with an electrically conductive first partial shield to form a relatively small predetermined first unshielded open area for the high frequency waves when placed in the electronic cooker; covering the top surface of said second compartment with an electrically conductive second partial shield to form a predetermined second unshielded open area for the high frequency waves when placed in the electronic cooker which is larger than said first unshielded area; covering the top surface of said third compartment with an electrically conductive third partial shield to form predetermined third unshielded open area for the high frequency waves when placed in the electronic cooker which is larger than said second unshielded area; covering the unshielded areas in said first, second and third partial shields with a dielectric member to provide a package therefrom; and placing said package in an electronic cooker at a certain temperature and for a period of time provide a cooked first food, a cooked second food and a cooked third food.

6. An article suitable for placing in an electronic cooker at a certain temperature to provide a cooked food after a certain time period which comprises a container having its bottom surface and four sides made from an electrically conductive material to act as shields against the high frequency waves in an electronic cooker; a frozen food in said container; an electrically conductive partial shield against the high frequency waves in an electronic cooker covering the top surface of said container to form a certain predetermined unshielded open area for the high frequency waves in the electronic cooker; and a dielectric member covering the unshielded open area in said partial shield.

7. An article suitable for placing in an electronic cooker at a certain temperature to provide a cooked first food, a cooked second food and a cooked third food after a certain time period which comprises a container having its bottom surface and four sides made from aluminum foil to act as shields against the high frequency waves in an electronic cooker; two dividers disposed intermediate the ends of the bottom surface to form a first compartment, a second compartment and a third compartment in said container; a first frozen food in said first compartment which independently requires a relatively short cooking time; a second frozen food in said second compartment which independently requires more cooking time than said first frozen food; a third frozen food in said third compartment which independently requires more cooking time than said second frozen food; an aluminum foil first partial shield against the high frequency waves in an electronic cooker covering the top surface of said first compartment in said container to form a relatively small predetermined first unshielded open area for the high frequency waves in the electronic cooker; an aluminum foil second partial shield against the high frequency waves in an electronic cooker covering the top surface of said second compartment to form a predetermined second unshielded open area for the high frequency waves in the electronic cooker which is larger than said first unshielded open area; an aluminum foil third partial shield against the high frequency waves in an electronic cooker covering the top surface of said third compartment to form a predetermined third unshielded open area for the high frequency waves in the electronic cooker which is larger than said second unshielded open area; and a dielectric plastic covering the unshielded open areas in said first, second and third partial shields.

8. The article according to claim 6 in which the electrically conductive material is aluminum foil.

9. The article according to claim 6 in which the dielectric member is plastic.

References Cited by the Examiner
UNITED STATES PATENTS

| | | | |
|---|---|---|---|
| 2,600,566 | 6/1952 | Moffett | 99—221 |
| 2,714,070 | 7/1955 | Welch | 99—221 |
| 3,079,912 | 3/1963 | Griem. | |
| 3,079,913 | 3/1963 | Nelson. | |

A. LOUIS MONACELL, *Primary Examiner.*